United States Patent [19]

Eriksson et al.

[11] Patent Number: 4,588,436

[45] Date of Patent: May 13, 1986

[54] METHOD OF RECOVERING METALS FROM LIQUID SLAG

[75] Inventors: Sune Eriksson, Hofors; Gotthard Björling, Djursholm, both of Sweden

[73] Assignee: SKF Steel Engineering, AB, Hofors, Sweden

[21] Appl. No.: 688,265

[22] Filed: Jan. 2, 1985

Related U.S. Application Data

[63] Continuation of Ser. No. 460,654, Jan. 24, 1983, abandoned.

[30] Foreign Application Priority Data

Apr. 7, 1982 [SE] Sweden ................... 8202224

[51] Int. Cl.$^4$ .................... C21B 13/12; C22B 4/00
[52] U.S. Cl. ........................ 75/10 R; 75/11; 75/14
[58] Field of Search ............ 75/10 R, 11, 14; 423/48, DIG. 10

[56] References Cited

U.S. PATENT DOCUMENTS

| | | | |
|---|---|---|---|
| 3,891,428 | 6/1975 | Yordanov et al. | 75/24 |
| 3,892,559 | 7/1975 | Quarm | 75/87 |
| 3,970,290 | 7/1976 | Santen et al. | 75/11 |
| 4,131,451 | 12/1978 | Lakernik et al. | 75/14 |

FOREIGN PATENT DOCUMENTS

| | | |
|---|---|---|
| 1533080 | 11/1966 | Fed. Rep. of Germany . |
| 2307237 | 2/1973 | Fed. Rep. of Germany . |
| 2900676 | 1/1979 | Fed. Rep. of Germany . |
| 77051308 | 5/1977 | Sweden . |
| 2077767 | 12/1981 | United Kingdom ............ 75/14 |

*Primary Examiner*—Melvyn J. Andrews
*Attorney, Agent, or Firm*—Armstrong, Nikaido, Marmelstein & Kubovcik

[57] ABSTRACT

Recovery of oxide or silicate-bound metals from liquid slag, in metallic or sulphidic form is carried out by reduction with carbonaceous reducing agent, the thermal energy required to maintain the temperature and perform the reduction and sulphidization being provided by blowing gas preheated in a plasma generator below the surface of the slag bath. The vapor of volatile metals is condensed in known manner in a condensor, the non-volatile metals and sulphides formed being collected in the form of molten drops which are allowed to settle out of the slag.

9 Claims, No Drawings

METHOD OF RECOVERING METALS FROM LIQUID SLAG

This application is a continuation of application Ser. No. 460,654, filed on Jan. 24, 1983, now abandoned.

The present invention relates to a method of recovering oxide or silicate-bound metals from liquid slag, in metallic or sulphidic form by reducing with carbonaceous reducing agent.

A method known as slag-fuming is used in non-ferrous metallurgy in order to recover zinc and other highly volatile metals in the form of oxides from liquid slags obtained from other processes. The method is generally performed by treating the liquid slag in batches in a furnace, the walls normally comprising water-cooled pipes. The treatment comprises blowing in coal dust through a number of tuyeres in the lower part of the furnace, together with air in stoichiometric deficiency. This air is termed primary air and it combusts some of the coat dust to form carbon monoxide, thus supplying the thermal energy required for most endothermic reduction processes. Even the significant heat losses through the furnace walls are covered in this manner.

The remainder of the carbon content in the coal dust, and carbon monoxide and hydrogen gas formed from the coal will then reduce any oxides of volatile metals such as zinc, lead, tin and bismuth existing in the slag, and these metals form metal vapour which accompanies the gas bubbles produced by the primary air and the reactions, up to the surface of the slag bath. The gas bubbles contain nitrogen, the two oxides of carbon, hydrogen and water vapour, as well as vapours of the metals mentioned. However, the partial pressure for these metals is extremely low and since the partial pressure for carbon dioxide and water vapour is considerable, it is impossible to condense the zinc vapour to liquid metal since re-oxidation cannot be prevented. For the other metals the partial pressure is usually much too low to permit condensation. In practice, zinc is the metal occurring in the greatest quantities, and also the one which is economically worth recovering.

Secondary air is supplied to the atmosphere above the slag bath in such quantities as to ensure complete combustion of both carbon monoxide and hydrogen gas, as well as metal vapours, the latter forming a fine-particles suspension in the exhaust. A quantity of heat is released which is substantially equivalent to the combustion heat in the coal dust supplied, and this heat is generally recovered in a waste heat boiler for the generation of steam. Although the whole unit may be considered as a steam generator in which the reduction of the metal oxides only contributes to the heat transmission, it must be noted that as a steam generator this unit has a considerably lower degree of thermal efficiency than conventional units.

The slag-fuming process is usually performed batch-wise, one batch being treated for as long as the value of oxides recovered plus the steam obtained corresponds to the cost of the coal dust plus other costs. Towards the end of a treatment, the specific coal consumption per ton of zinc recovered rises extremely sharply. If the treatment were continuous, it would be necessary to work with a low zinc content in the slag, where the specific coal consumption is about twice the average, the average being around 2 ton coal dust/ton zinc.

Although in many cases the slag-fuming process functions satisfactorily from an economic point of view, it has the essential drawback that the mixed oxide obtained, that is the product filtered out after the waste heat boiler, contains the zinc and other metals in the form of oxides, a relatively low-value form of metal concentrate, which must be subjected to further reduction in order to extract the full value of the metals. Furthermore, utilization of the steam obtained is necessary to the economy of the process.

The present invention enables metals in a liquid slag to be recovered as such or as their sulphides by reduction of the oxide or silicate-bound metals with a carbonaceous reducing agent, the thermal energy required to maintain the temperature and perform the reduction and sulphidization being provided by blowing in gas preheated in a plasma generator below the surface of the slag bath, after which the vapour of volatile metals is condensed in known manner in a condensor, and the non-volatile metals and sulphides formed are collected in the form of molten drops which are allowed to settle out of the slag.

The invention is based on the same principle as described above for the reduction itself, through reaction between solid carbon or carbon monoxide and metal oxides dissolved in the slag, but differs entirely with respect to the supply of heat. In a specific case exemplifying the invention, a certain amount of exhaust gas is returned and is strongly overheated by being passed through a plasma generator in which an electric discharge occurs, the gas thus acquiring an energy content of about 5.5 kWh/Nm$^3$, for instance. The hot gas is then blown into the slag through a water-cooled tuyère and, at the same point, coal dust is blown into the slag, also with the help of circulating gas. Vapours of the volatile metals to be recovered are collected in the gas bubbles in the manner described for the slag-fuming process, the difference here being that the gas mixture is not combusted over the bath surface but is used to condense the metals to liquid metal in a condensor. Metals not easily volatilized are separated as drops and allowed to settle.

Since no combustion of carbon with oxygen from the air occurs, the carbon is consumed only by the quantity of reducible oxides existing in the slag and, to some extent, by carbon dioxide and water vapour in the transport gas. The reduction reactions are endothermic and the speed at which the reductions take place is thus dependent not only on the supply of coal dust or other reducing agent but also on the heat supplied through the hot circulating gas which must cover both the reaction energy requirement and heat losses through the water-cooled walls.

The reduction reactions will be somewhat different if the aim is to recover volatile metals such as zinc and metals like chromium which are difficult to reduce, or if the aim is only to recover not easily volatilized, relatively easily reduced metals such as iron and lead. For zinc vapour the equilibrium for the reactions

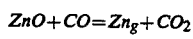

and

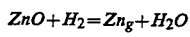

at high temperatures, i.e. over about 1000° C., is displaced to the right but at lower temperatures it is displaced to the left, i.e. it is difficult to condense zinc vapour in the presence of carbon dioxide and particularly water vapour. In such cases, therefore, it must be calculated that it is only the carbon content in the reducing agent, for instance pit coal, which has a reducing effect, i.e. all reduction of zinc oxide takes place in accordance with the general reaction formula $$ZnO + C = Zn_g + CO$$

Carbon dioxide and water vapour are reduced to carbon monoxide and hydrogen gas. The hydrogen content of the pit coal is found as hydrogen gas in the exhaust. For this reason coal poor in gas should preferably be used. This also applies to metals which are difficult to reduce, which are oxidized by carbon dioxide and water vapour.

If the aim is only to recover easily reduced metals, a certain amount of carbon dioxide and water vapour is permissible in the exhaust. In this case coal rich in gas may advantageously be used.

The invention will now be described with reference to an Example illustrating experiments performed.

EXAMPLE

A slag containing 16% Zn and 2% Pb was treated in accordance with the invention at a temperature of 1250° C. The slag remaining after the treatment contained 2.6% Zn and 0.06% Pb, i.e. 140 kg zinc and 19 kg lead were recovered per ton of slag. The coal dust used as reducing agent contained carbon and hydrogen in a weight ratio of 6:1 and, since the hydrogen content of the coal dust does not take part in the reduction and since all carbon must form carbon monoxide in the exhaust gas, the volume ratio $CO:H_2$ will be 1:1.

The gas heated in the plasma generator had an energy content of 5.5 kWh per $Nm^3$, which is equivalent to about 100 Mcal per kmol gas. Furthermore, circulation gas was used to blow in the coal dust and a quantity of 20% of the heat transport gas was required for this purpose.

The outgoing slag constituted 75% of the weight of incoming slag. Since the outgoing slag was slightly warmer than that incoming, the same enthalpy was calculated for both slags for the sake of simplicity According to an empirical figure from conventional slag-fuming the heat loss through the water-cooled furnace walls was estimated to be 500 Mcal per ton slag during a two-hour period, and since the treatment time is usually about 1 hour, the heat losses are set at 250 Mcal/ton slag. 1000 kg of slag was used as the basis for the calculation.

| | Mcal |
|---|---|
| Energy requirement for reduction | |
| Zinc, 140 kg | 119 |
| Lead, 19 kg | 3 |
| Enthalpies leaving at 1250° C. | |
| 2.1 kmol zinc vapour | 80 |
| 0.1 kmol lead vapour | 5 |
| 2.2 kmol CO | 21 |
| 2.2 kmol $H_2$ | 20 |
| X kmol trp gas, energy | 9.3 X |
| 0.2 kmol trp gas, heat | 1.9 X |
| Total | 248 + 11.2 X |
| Energy balance: | |
| 248 + 11.2 X + 250 = 100 X | |
| X = 5.6 kmol, corresponding to 125.4 $Nm^3$ | |
| Volume of exhaust gas 13.3 kmol. | |

| | Mcal |
|---|---|
| 2.1/13.3 = 15.8% Zn in the gas to the condensor | |

Energy requirement 560 Mcal/ton slag, corresponding to 400 Mcal/ton zinc or 4650 kWh/ton zinc as metal. At a thermal efficiency degree of 85% in the plasma generator, the consumption of electric energy will be 5470 kWh/ton zinc. However, it should be pointed out here that after condensation of the zinc the exhaust gas has a considerable energy content.

By way of comparison it may be mentioned that in conventional slag-fuming the energy consumption is about 14000 Mcal or about 16000 kWh/ton zinc as zinc oxide, but this energy is pure thermal energy. For the electrolytic production of metallic zinc from such oxides an additional almost 4000 kWh/ton zinc are required in the form of electric energy.

It may be mentioned that by supplying energy in the form of plasma-heated gas, the optimum temperature for the reduction can be chosen. Furthermore, since a higher partial pressure is used for the CO gas—compared with slag-fuming—the reduction is facilitated even if the zinc content in the slag is low, so that the process is quicker.

Furthermore, if the zinc content in the slag falls, this is reflected only in a slow decrease of the zinc content in the gas to be subjected to condensing. This means that continuous operation is advantageous since the slag rich in metal is added as the depleted slag is tapped off and the condenser thus operates under constant conditions, which is necessary to obtain a good yield in this part-process.

However, the invention is not limited to the specific embodiment described in the Example. According to another embodiment the reducing agent may be a solid supplied in the form of coke or the like from above, on to the surface of the slag bath. In the KIVCET furnace heat is supplied by electrodes immersed in the slag bath which do not cause any turbulence. The de-zincing is thus very incomplete. According to the invention, blowing in the hot gas produces extremely vigorous turbulence, which is necessary for a high zinc yield. If the slag contains sulphur, copper matte can be separated out, and if not, material containing sulphur can be blown into the slag in order to obtain copper matte. Sulphidizing agents can, like the carbonaceous reducing agents, either be blown into the slag e.g. with the plasma heated gas, or introduced in solid or liquid form at the surface of the slag bath.

According to another embodiment, material containing oxide such as solidified slag or oxide concentrate, can be blown into the slag e.g. with the coal dust, to enable the plant to be used for different raw products. This material containing oxide may also be added from above the slag bath. Additive containing sulphide can also be treated in this way. Obviously, the supply of energy and reducing agent must be adjusted to enable equivalent treatment both of these materials and of the slag.

According to another embodiment of the invention, metals or sulphides which are not easily volatilized can be reduced from the slag. These are then collected in fine drops in the slag and can be separated out either in the actual reduction furnace or in a fore-hearth through which the slag passes after tapping.

One application of the invention is the treatment of converter slags rich in cobalt from the copper and nickel industry. During copper matte melting, cobalt is collected in the copper matte as well as copper and nickel, but since cobalt has a considerably greater affinity to oxygen than copper and nickel, when the copper matte is blown to the concentration copper matte, a considerable amount of cobalt will be turned to slag with the iron. Normally the converted slag is subjected to a certain reduction in an electric arc furnace, being treated with coke lying on the surface. However, the turbulence is insufficient to give anything like complete recovery of the cobalt content in the copper matte formed by separated metals and the sulphur content of the slag.

If, instead, a specific quantity of carbonaceous reducing agent is blown in together with a similar specific quantity of sulphide material, while at the same time supplying heat in the form of plasma-heated exhaust gas, thanks to the vigorous turbulence in the slag bath, the degree of reduction can be accurately balanced so that not too much iron is reduced out, which would result in too poor cobalt copper matte. The sulphur content of the matte can also be determined in this way, and thus also the recovery of cobalt from converter slag can be optimized.

Another application of the invention is the treatment of slags from autogenic melting of copper concentrate, i.e. without the addition of fuel. These slags contain so much copper that they cannot be considered as final slags and are therefore treated either by means of slow solidification, grinding and flotation-enrichment, or by light reduction and sulphidization in an electric arc furnace. The first method is expensive, but the second is not particularly effective since the turbulence is insufficient to achieve equilibrium. Better results are obtained by using the method according to the invention, blowing in reducing and sulphidizing agent and supplying energy by way of plasma-heated exhaust gas. Since this type of slag often contains zinc, the method also permits zinc to be recovered as liquid zinc.

Another example of an application suitable for the invention is the treatment of sulphur pyrite containing precious metals. After dead roasting, the precious metals are normally leached out of the silicon with cyanide. They may also be leached out after chlorinating roasting but these methods, which are a combination of pyrometallurgy and hydrometallurgy, are complicated and therefore costly. Furthermore, platinum metals cannot be recovered in this manner. The above disadvantages are overcome by the use of the present invention. The roasting material is blown into a slag bath, kept hot by the supply of circulating, plasma-heated exhaust gas, together with a material containing lead oxide and enough carbonaceous reducing agent for all the lead to be reduced out and as much of the iron as corresponds to the sulphur content of the charge. A lead smelt is then obtained which absorbs all the precious metals, as well as dissolving metal sulphides formed. If, as is often the case, the roasted pyrites also contain small quantities of other heavy metals such as copper and zinc, the sulphur additive must of course be adjusted so that these metals can also form sulphides which either dissolve in the lead smelt or form a special matte phase.

After the tapping, or in conjunction therewith, the lead smelt is separated off and continues for treatment to recover the precious metals by known methods in which the lead must be stripped and converted to lead oxide. This lead oxide can suitably be used as the material containing lead which must be blown into the slag bath.

The copper matte possibly formed will have a certain content of precious metals, particularly gold, but this can easily be recovered by treating in known manner.

After transfer to a second furnace of similar design, the iron-enriched slag melt obtained for the manufacture of crude iron can be treated by blowing in reducing agent. None of the methods mentioned above permit utilization of the iron content in the pyrites and this is yet another big advantage of the present invention.

Blowing in the oxide material together with a specific quantity of reducing agent in accordance with the invention, offers a reduction selectivity which is unsurpassed by any other metallurgical method. This is especially important when treating roasted goods from bulk concentrates which are produced from complex sulphide mineral and contains sulphides of zinc, copper and lead, as well as even iron, the latter constituent making these concentrates difficult to treat in conventional metal works. During treatment in a slag bath according to the invention, the reduction can be balanced so that only the desired quantity of iron is reduced out in the matte phase in which the copper is collected, and where the sulphur content in the charge must also be adjusted to the composition of this phase. Zinc is nearly always present as the predominant non-ferrous metal in the bulk concentrate and is condensed as from the exhaust gas in the form of liquid zinc. If the copper content is also high, it may be advisable to recover the copper in a form containing iron, known as black copper, instead of in the form of copper matte, since a high sulphur content in the charge may complicate the recovery of zinc as liquid metal. On the other hand, if the copper content is low, it can be dissolved in the lead instead of forming a matte phase.

In the event of low lead content, the lead should preferably be dissolved in the copper matte or black copper. If the charge contains arsenic and/or antimony, it may be advisable to keep the sulphur content low so that these elements can be bound in a speiss as otherwise, being so volatile, they would accompany the zinc vapour and contaminate the liquid zinc.

Another example of an application of the invention is the production of high-grade ferrochromium from low-grade ore. The cheapest raw material is fine-grained and has a chromium:iron ratio of about 1:8. It must be sintered or pelletized but will still give a ferrochromium containing only about 50% Cr after reducing melting with coke. Two plasma-heated slag furnaces of the type described above are used when performing the present invention. The fine-grained chromium ore or concentrate is blown into the first furnace together with slag-former and with a deficiency of carbonaceous reducing agent, whereupon so much iron is reduced out that the slag acquires a chromium:iron ratio of about 3 and an acceptable crude iron can be tapped off. This slag is now allowed to flow to the second furnace where enough reducing agent is used for all the iron and most of the chromium to be reduced out and a high-grade ferrochromium with about 70% Cr is obtained. This process thus has a number of advantages: low-ratio raw material can be used, the raw material need not be agglomerated, any type of carbonaceous reducing agent can be used, and the excess iron in the raw material can be utilized as crude iron.

We claim:

1. A method of recovering oxide-bound or silicate-bound metal in metallic or sulphidic form from liquid slag containing metal oxides, metal silicates or metal sulphides comprising the steps of maintaining the liquid slag in the form of a bath in a furnace, providing a recirculation gas and heating said recirculation gas by passing said gas through a plasma generator, thereafter blowing said heated gas together with a carbonaceous reducing agent and/or a sulphidizing agent into the bath of liquid slag below the surface thereof, providing sufficient heat energy by means of the plasma generator such that substantially no combustion of carbon is required to provide the heat necessary to cause the endothermic reduction of the metal oxide, causing the carbon in the carbonaceous reducing agent to react with the metal oxides or silicates in the slag and to reduce said metal oxides or silicates to metal vapor, liquid metal or metal sulphide, depending upon the composition of the slag, allowing reduced metal vapor formed in the slag to pass upwardly through the molten slag in the form of bubbles and allowing liquid metal or metal sulphide formed in the slag to form droplets in the slag, controlling the temperature and oxygen potential in the recirculation gas so as to prevent substantial re-oxidation of the reduced metal vapor, liquid metal or metal sulphide, collecting metal vapor as formed above the slag surface and condensing said metal vapor in a condensor and separating said droplets of liquid metal or metal sulphide as formed from the slag.

2. Method according to claim 1, which comprises the step of introducing a solid carbonaceous reducing agent at the surface of the slag.

3. Method according to claim 1, which comprises blowing a sulphurous sulphidizing agent into the slag at the same time as the plasma-heated gas.

4. Method according to claim 1, which comprises the step of introducing a solid or liquid sulphidizing agent at the surface of the slag.

5. Method according to claim 1 which comprises carrying out the treatment of the slag continuously.

6. A method according to claim 1 wherein the metal recovered is at least one of the group consisting of zinc and lead.

7. A method according to claim 1 including the steps of allowing said droplets of liquid metal metal sulphide to settle out of the slag and collecting the metal metal sulphide by separation.

8. A method according to claim 1 including the step of recovering metals contained in a material other than said slag by introducing said material into the slag and treating said slag and said material together with said heated gas.

9. A method according to claim 1 including the steps of allowing said droplets of metal sulphide to settle out of the slag and collecting the metal sulphide by separation.

* * * * *